Figure 1:
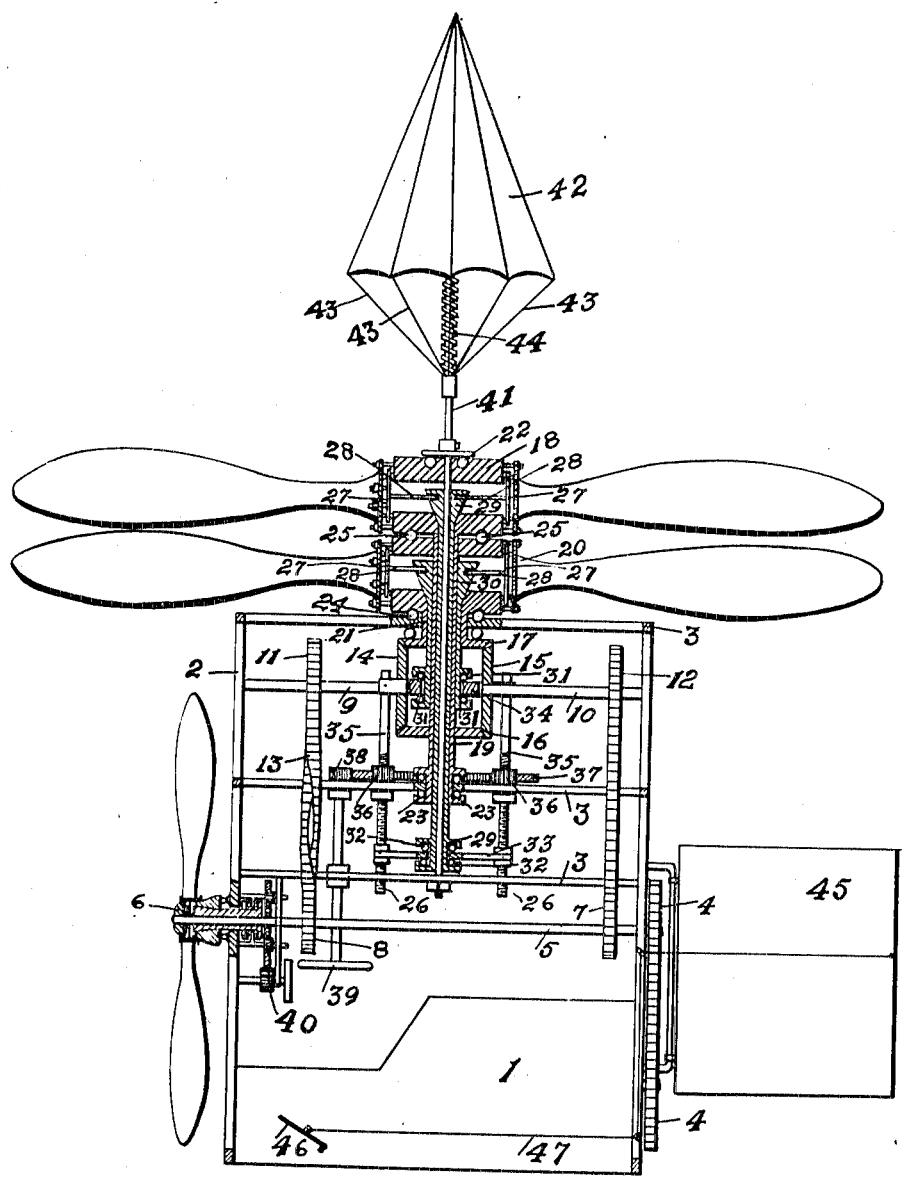

H. B. LISTER.
AERIAL MOTOR VEHICLE.
APPLICATION FILED JAN. 30, 1911.
1,084,806.
Patented Jan. 20, 1914.
2 SHEETS—SHEET 2.
FIG 2
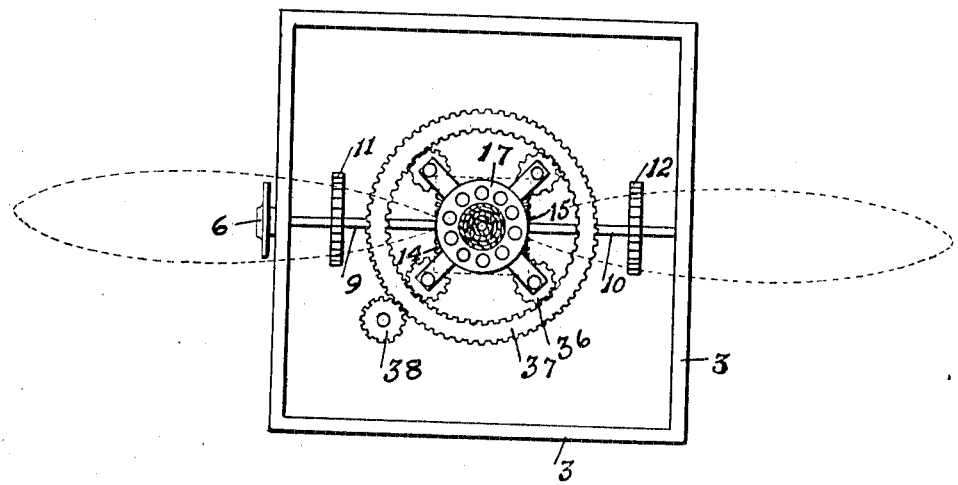
FIG 3    FIG 4    FIG 5    FIG 6
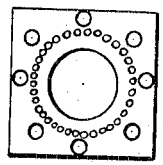  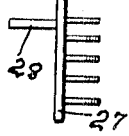  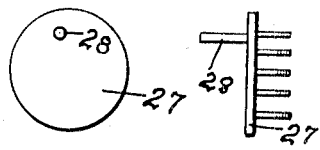  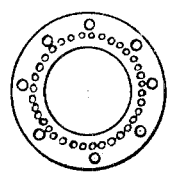
FIG 7
WITNESSES
H. E. Stone
F. B. Wilson
INVENTOR
Henry Bertram Lister
IN PROPRIA PERSONA

UNITED STATES PATENT OFFICE.

HENRY BERTRAM LISTER, OF SAN FRANCISCO, CALIFORNIA.

AERIAL MOTOR-VEHICLE.

1,084,806.  Specification of Letters Patent.  Patented Jan. 20, 1914.

Application filed January 30, 1911. Serial No. 605,369.

*To all whom it may concern:*

Be it known that I, HENRY BERTRAM LISTER, a citizen of the United States, residing in the city and county of San Francisco, State of California, have invented a new and useful Aerial Motor-Vehicle, of which the following is a specification.

My invention relates to a heavier than air flying machine, in which planes are entirely dispensed with and their place taken by two concentric screw propellers of opposite pitch, made of metal, wood or composition, which are made to rotate in opposite directions by means of concentric cog gears, upon concentric shafts, similar to the shafts that turn the hands of a clock, the propellers being superimposed like the hands of a clock; the concentric cog wheels are so arranged that by reason of the resistance of respective propellers, each one reciprocally acts as the fulcrum whereby the other is driven, the power being communicated from the engine by means of cog gears on a horizontal shaft and an arrangement of sprocket wheels and chain gears. The machine also has one or more propellers for driving it in a horizontal direction, which are connected to a horizontal shaft or shafts, which is connected to the engine by means of chain gears and sprocket wheels. There is also a contrivance for changing the pitch of the propellers while they are in motion, which is accomplished by having the blades of the propellers separate from the hub, which is hollow, by having a concentric shaft, or two rods, either inside or outside the driving shaft, and which turns synchronously with it, and by means of which circular disks to which the blades of the propellers are attached can be turned and their pitch changed. I also have a device for changing the pitch of two propellers simultaneously and to a similar extent, while in motion, by means of four bolts running through four stationary nuts, supplied with cog gears, which are all turned simultaneously by a wheel which is cogged both on its convex and concave circumference. By means of these devices the respective propellers can at will be changed from propellers into gyroscopes and vice versa, or the pitch may be so adjusted that they partake of both these qualities. Thus the pitch of the propeller on the horizontal shaft can be set at zero, and it will practically be a gyroscope, the pitch of the lifting propellers can be given a large angle and all the power will be devoted to lifting the machine vertically, when the required height is obtained, the pitch of the lifting propellers can be reduced to a minimum, and the full power thrown on the driving propeller by changing its pitch to a maximum.

My invention also consists of a central vertical shaft or rod, which projects upward into the air and to which a parachute is attached, which is always partially opened and kept from flying open by a light spring. Upon the machine obtaining a downward velocity the parachute will open. As the downward velocity decreases the spring will close it to its ordinary position. The hub of the propeller is hollow, with two circular, movable disks, to which the blades are attached. The blades may be made of wood, metal, composition, or hollow pressed steel.

I attain these objects by the mechanism illustrated in the accompanying drawing in which—

Figure 1 is a sectional elevation of the entire machine; Fig. 2, plan elevation; Fig. 3, detail of hub of propeller; Fig. 4, plan of disk; Fig. 5, side elevation of disks; Fig. 6, detail of collar which fits over disk; Fig. 7, elevation of blade of propeller.

Similar figures refer to similar parts throughout the several views.

The engine casing 1 and the standards 2 and the cross sections 3 constitute the frame of the machine. The power generated by the engine is transmitted by means of the sprocket wheels 4 to the shaft 5 which is attached to the screw propeller 6, the blades of which are arranged to pitch from zero to an angle of 40 degrees, by the mechanical device shown in the drawing, Fig. 1, and which is more fully explained hereafter. This propeller acts as a gyroscope, when the blades are set at zero, and moves the machine in a horizontal direction when the blades have any pitch. The shaft 5 transmits power by means of two sprocket wheels 7 and 8 to the shafts 9 and 10 by means of chains to the sprocket wheels 11 and 12, the chain 13 from wheel 8 to wheel 11 being crossed so as to cause the shaft 9 to turn in a different direction to the shaft 10; so also the cogwheel 14 will turn in the opposite direction to the cogwheel 15. The cogwheels are beveled at an angle of 45 degrees, and they work the cogwheels 16 and 17, which are also beveled at an angle of 45 degrees. The cogwheels 14 and 15 being the levers, then the cogwheels 16 and 17 will each reciprocally be the fulcrum, by which each is turned. The hub of the propeller 18 is connected by the hollow shaft 19 to the cogwheel 16 and the hub of the propeller 20 is connected by the hollow shaft 21 to the cogwheel 17. The screw propeller 18 will turn in the same direction as the cogwheel 16 and the screw propeller 20 will turn in the opposite direction. The shaft 19 is secured in position by the ball-bearing 22 on the top and by the ball-bearing 23 at the other end, and the shaft 21 is secured in position by the ball-bearing 24 at one end and by the ball-bearing 25 between the two hubs. By these means the two screw propellers are made to turn in different directions and to balance each other. By means of the nuts 26 the relative pitch of the two screw propellers 18 and 20 can be adjusted to exactly balance each other, and thereby avoid any tendency for the car to rotate in opposition to the resistance of the propellers, which would occur from the difference in resistance in the atmosphere if they were not exactly equal. The nuts 26 secure the bar 33 in a fixed position with respect to the bar 34, and by their movement up or down they determine the pitch of one propeller with respect to the other, the two propellers having their pitches simultaneously changed by the vertical movement of the bars 33 and 34 upon the vertical movement of the supporting rods 35. It will be apparent that owing to the fact that one propeller works over the other propeller that the lower propeller must have a somewhat greater initial pitch to enable it to balance the torque of the upper propeller since it is turning in the air, which is moving from the upper propeller downwardly at a velocity determined by the slip of the upper propeller. The blades on all the propellers are separate from the hub and preferably are made of pressed steel. They are each bolted to a separate movable disk 27 in the hub, which can be turned through an arc of 40 degrees, by means of crank pins 28 slotted in the adjusting shafts 29 and 30, which are concentric with the driving shafts. The blade need not have enough movement to reverse, but it must be capable of being turned to zero, at which point the propeller will practically be a gyroscope. In the hubs the movable disks are attached by means of crank pins set near their inner diameters in a rectangular slot in the lugs of the shafts 29 and 30 which are moved by the raising or lowering of the ball bearings 31 and 32 attached to the guide crosses 33 and 34, which simultaneously change the pitch of propellers 18 and 20 in an equal amount. The guide crosses 33 and 34 are simultaneously raised or lowered by means of four bolts 35 running through nuts 36 which are sunk in the support, and have each a cogwheel on top and a collar on the bottom, so that while they may turn they cannot rise or fall. These four cog geared nuts are surrounded by a cogwheel 37 which is cogged both on its concave and on its convex circumference. The outside circumference is geared to the cogwheel 38, so that on turning the wheel 39 the cogwheel 37 in turn will rotate the four nuts 36, which will raise or lower the four bolts 35 to which are attached the guide crosses 33 and 34, and this will rotate the four disks 27 in the propellers 18 and 20 so that all four blades of the two propellers will change their pitch simultaneously and to the same extent. The rods 35 are adjusted by means of the flanged internally threaded pinions 36. These pinions are secured to a suitable fixed cross 33' which is connected with the side frame 3. By a substantially similar device 40 the pitch of propeller 6 is changed as shown on the accompanying drawing. The hubs of the propellers are made hollow and preferably of cast steel or an alloy of steel and aluminum. The blades are separate from the hubs as shown in Fig. 7. The movable disks 27 work on ball-bearings near the circumference to give all the leverage possible, which are shown in Figs. 3 and 6, and these are secured to the hub by a collar with ball bearings which is bolted to the hub, and which laps over it to the extent of the bearing shown in Fig. 6. The blades will always form parts of a screw except when they are placed at zero, when they will be gyroscopes.

The rod 41 is stationary, being bolted at its lower end to the frame and having adjusting nuts, so that any slack in the upper propeller can be corrected from below while the machine is in motion, the upper end of the rod forms the apex of a parachute 42 which is formed like an umbrella only the supporting rods 43 connect to the lower circumference of the parachute. The parachute is kept partially closed by the spring 44, but is at the same time sufficiently open so that upon the machine obtaining a downward velocity it will open by the pressure of the air, and will automatically close again as soon as the downward velocity is decreased. The parachute is made of strong canvas or other suitable material, with thin steel supporting rods 43.

All the blades of the propellers can be set at zero, when starting the engine, and when sufficient speed is attained the upper propellers can be given pitch, while the propeller 6 remains at zero, the machine will then rise in a vertical direction and by giving pitch to the blades of propeller 6 the machine will rise obliquely. The relative pitches of the lifting propellers and the traction propeller 6 is such that by increasing the pitch of propeller 6 to its maximum, the machine will rise at an angle of 45 degrees; by decreasing the pitch of the blades on propellers 18 and 20 the obliqueness can be reduced until the machine will travel in a horizontal line, the propellers 18 and 20 all the time maintaining their velocity, but having only just sufficient pitch to overcome the attraction of gravity. By taking the pitch off the propeller 6 the machine would remain poised in the air in one position, all the propellers acting practically as gyroscopes and being practically rigid and immovable.

The machine is steered by the rudder 45 which is moved by pedals on either side of the engine and connected by cords 47 to it. The pedal 46 on the left side with its cord connection 47 is shown in the drawing, the driver's seat being astraddle of the engine.

I claim:

1. In an aerial machine, a pair of oppositely pitched concentric screw propellers, one over the other, means to rotate said propellers in opposite directions, means to simultaneously vary the pitch of both of said propellers, means to drive said machine forwardly, and a rudder for steering said machine, substantially as described.

2. In an aerial machine, a frame, a pair of oppositely pitched concentric screw propellers, one over the other, means to simultaneously adjust the pitch of both of said propellers, means to rotate said propellers in opposite directions, a screw propeller having adjustable blades for driving said machine forwardly, and a rudder for steering said machine, substantially as described.

HENRY BERTRAM LISTER.

Witnesses:
H. E. STONE,
L. H. ANDERSON.